Patented Apr. 11, 1950

2,504,024

UNITED STATES PATENT OFFICE 2,504,024

PROCESS OF PRODUCING HEXA-METHYLENEDIAMINE

Benjamin W. Howk, Wilmington, and Gerald M. Whitman, New Castle, Del., assignors to E. I. du Pont de Nemours & Company, Wilmington, Del., a corporation of Delaware No Drawing. Application September 10, 1947, Serial No. 773,306

8 Claims. (Cl. 260—583)

This invention relates to a catalytic hydrogenation process and especially to the preparation of hexamethylenediamine by catalytic hydrogenation.

Hexamethylenediamine is an important intermediate for the synthesis of polyamides and polyester-amides and its preparation has been the subject of numerous investigations. A successful and efficient method for its preparation is by the hydrogenation of adiponitrile in the presence of ammonia, using either nickel or cobalt catalysts. A new potential source of hexamethylenediamine has become available, namely, 1,4-dicyano-2-butene and 1,4-dicyano-1-butene. In contrast to adiponitrile when a 1,4-dicyanobutene is hydrogenated in the presence of ammonia it undergoes extensive side reactions, which materially reduce the yield of the desired hexamethylenediamine. It is for this reason that it has heretofore been thought necessary, when hydrogenating a 1,4-dicyanobutene, to conduct the hydrogenation in two steps, firstly, to reduce the double bond with alloy-skeleton nickel as the catalyst and then the nitrile group, using cobalt as the catalyst. (See page 698 in German Synthetic Fiber Development, Report by Synthetic Fibers Team of T. I. I. C.)

It is an object of this invention to hydrogenate 1,4-dicyanobutenes to hexamethylenediamine in one operation. A further object is to convert 1,4-dicyanobutenes to hexamethylenediamine in good yields.

These objects are accomplished by heating the reactants consisting of 1,4-dicyanobutene and hydrogen at a temperature in the range of 75° to 200° C. and in the presence of a cobalt hydrogenation catalyst. It has now been found that 1,4-dicyanobutenes can be successfully hydrogenated in one step to hexamethylenediamine by contacting the dicyanobutene with hydrogen in the absence of ammonia at a temperature of 75° to 200° C. over a catalyst containing active cobalt as an essential component.

In actual practice the 1,4-dicyanobutene is mixed with an inert solvent, such as water or an aliphatic alcohol or ether, such as dimethyl ether, dioxane, tetrahydrofurane, and the like, or a hydrocarbon such as cyclohexane, and the mixture reacted with hydrogen under pressure in excess of 400 lbs./in.² at a temperature of from 75° to 200° C. over a cobalt hydrogenation catalyst.

The process of this invention may be carried out either batchwise or as a continuous or semi-continuous operation.

In operating batchwise a pressure vessel is deoxygenated either by evacuation or by sweeping it with deoxygenated nitrogen, and charged with the nitrile, a solvent in amount sufficient to yield a solution containing from 2 to about 50% by weight of the nitrile, and an active cobalt catalyst in amount of from 2 to 100% by weight of the nitrile. The reactor is connected to a source of hydrogen, placed on a rocker mechanism to provide efficient agitation, and pressured with hydrogen. Heating and agitation are started and the pressure and temperature conditions selected for conducting the reaction maintained until reaction is complete, as evidenced by cessation of hydrogen absorption. After reaction is complete, the reactor is permitted to cool, opened, and the contents discharged and filtered to remove the catalyst. The hexamethylenediamine is isolated from the filtered reaction mixture by distillation or other means known to the art.

In a continuous process the nitrile, as such, or as a 2-50% solution by weight in an inert organic solvent, and hydrogen are passed over a bed of active cobalt catalyst, heated to the selected reaction temperature, either co-currently or counter-currently at a space velocity corresponding to between 0.10 and 0.50 grams of the nitrile per cc. of catalyst per hour.

Theoretically 5 moles of hydrogen per mole of dicyanobutene are required for the hydrogenation of the dicyanobutene to hexamethylenediamine. In practice a large excess of hydrogen over the theoretical requirements is used and in continuous operation this excess is about ten-fold.

As previously indicated, in the batch operation of the process of this invention the amount of cobalt catalyst employed may vary from 2 to 100% by weight of the 1,4-dicyanobutene. Generally, however, satisfactory results from the standpoint of yield are obtained using amounts of cobalt catalyst in the range of 2 to 25% by weight and this range comprehends the proportions most generally employed.

Although the process may be operated at atmospheric pressure, it is preferred to carry out the hydrogenation under super-atmospheric pressures which are generally in excess of 400 lbs./in.² because the reaction rate and yield of desired hexamethylenediamine increases with increasing pressure up to a certain limit. From the standpoint of economy, yield per unit of catalyst, and reaction rate, pressures of from 4000 to 9000 lbs./in.² represent the most widely useful pressures. For practical reasons pressures of the order of 20,000 lbs./in.² represent the upper pressure limit.

The process may be carried out at temperatures of from 75° to 200° C. However, satisfactory reaction rates are obtained at temperatures of from 90° to 140° C. and this range is regarded as the most useful.

The examples which follow are submitted to illustrate and not to limit this invention.

Example I

A small shaking autoclave is swept free of oxygen by sweeping it with deoxygenated nitrogen, and charged with 31.2 parts of purified 1,4-dicyano-2-butene, 79 parts methanol, and 8 parts finely divided cobalt metal, prepared by the alkali activation of a cobalt-aluminum alloy. The autoclave is sealed, pressured with hydrogen, and heated. Absorption of hydrogen occurs at 100-110° C. and in the pressure range 1500-2500 p. s. i. Over a period of 3.5 hours the pressure drop amounts to 2000 p. s. i. When the hydrogenation is complete, as indicated by cessation of pressure drop, the tube is cooled, pressure is released, and the products are rinsed out with methanol. The resulting solution is filtered to remove catalyst, 50 ml. water is added, and the products are separated by fractional distillation. Twenty-one and one-tenth parts hexamethylenediamine, corresponding to a 60.7% conversion is obtained, together with 2.3 parts hexamethyleneimine, distilled as its azeotrope with water, and 1.8 parts of high-boiling liquid.

Example II

Thirty-one and eight-tenths parts purified 1,4-dicyano-2-butene, 79 parts methanol and 25 parts metallic cobalt prepared by the hydrogen reduction of cobaltous oxide are placed in a small shaking autoclave. The vessel is pressured to 650 atm. with hydrogen and heated to 120° C. When the temperature reaches 90° C. the absorption of hydrogen begins and is essentially complete by the time the temperature has reached 120° C. The autoclave is repressured with hydrogen to 980 atm. and shaking is continued for four hours to insure completion of the reaction. The autoclave is cooled to room temperature, the pressure released, and the products rinsed out with methanol. Following filtration to remove catalyst, the products are separated by fractional distillation. Twenty-four parts of hexamethylenediamine, corresponding to a 70.9% conversion, is obtained. The other products are minor amounts of hexamethyleneimine, distilled as its water azeotrope, and 3 parts of a polymeric residue.

Example III

Example II is duplicated, except that 104 parts dioxane is substituted for the methanol of Example II. The products consist of 25.4 parts hexamethylenediamine, 2 parts hexamethylenimine, and 4 parts polymeric residue. The quantity of diamine isolated corresponds to a 73% conversion.

Example IV

Example II is duplicated, except that 25 parts of a cobalt catalyst consisting of metallic cobalt and metallic copper in the weight ratio 10:1 is substituted for the reduced cobalt catalyst of Example II. The products of the hydrogenation consist of 28.6 parts hexamethylenediamine, 1.3 parts hexamethylenimine, and 2.6 parts polymeric residue. The quantity of diamine isolated corresponds to an 82% conversion. The catalyst in the above example is prepared by mixing cobaltosic oxide ($Co_3O_4$) with cuprous oxide ($Cu_2O$). The mixture is pelleted, sintered at 900° C., crushed to a powder, and reduced in hydrogen.

Example V

Example II is duplicated, except that 31.8 parts purified 1,4-dicyano-1-butene is substituted for the 1,4-dicyano-2-butene of Example II. Twenty-five and six-tenths parts of hexamethylenediamine corresponding to a 73.5% conversion, 2.1 parts hexamethylenimine, and 3.5 parts polymeric residue are isolated.

Example VI

A vertically mounted steel cylinder capable of withstanding high pressures is charged with a layer of silica chips, 110 parts of 8-14 mesh reduced cobalt catalyst, prepared by the reduction of cobaltous oxide in hydrogen, and a zone of silica chips to serve as a preheating section for the incoming reactants. The top of the tube is fitted with lines for the simultaneous introduction of gaseous hydrogen and a liquid reactant stream at controlled rates. The outlet end of the tube is connected to product separators and a suitable pressure let-down system. The steel tube is mounted in an electric furnace. A 5% solution of purified 1,4-dicyano-2-butene in methanol is introduced into the top of the tube at the rate of 240 parts per hour. A ten-fold excess of hydrogen at 550-600 atm. pressure is passed downward through the catalyst concurrently with the dicyanobutene solution. The temperature of the catalyst zone is maintained at 120° C. Under these conditions 12 parts of dicyanobutene is passed over 110 parts of catalyst each hour. During nine hours running time 114.9 parts dicyanobutene is introduced. The methanol solution, obtained from the product separator, is fractionally distilled yielding 111.4 parts hexamethylenediamine, 4.1 parts hexamethylenimine, isolated as its azeotrope with water, and 8.0 parts residue. The quantity of hexamethylenediamine isolated corresponds to an 88.7% conversion.

Example VII

Example VI is duplicated, except that a twenty-fold excess of hydrogen is employed. During a period of five hours, 64.3 parts 1,4-dicyano-2-butene is passed through the converter and the products obtained consist of 64.5 parts hexamethylenediamine, corresponding to a 91.5% conversion, 1.9 parts hexamethylenimine, and 4.0 parts polymeric residue.

Example VIII

Example VI is duplicated, except that the hydrogen pressure is maintained at 265-300 atm. Over a period of eight hours a total of 100.1 parts dicyanobutene is injected and 87.33 parts hexamethylenediamine, corresponding to a 79.7% conversion, 6.1 parts hexamethylenimine, 1.0 part ε-aminocapronitrile, and 9.5 parts polymeric residue are isolated.

Example IX

Example VI is duplicated, except that a 10% solution of 1,4-dicyano-2-butene in methanol is employed and the volume of catalyst is increased from 110 to 220 parts. A total of 194.6 parts 1,4-dicyano-2-butene is passed over the catalyst during a period of eight hours. The products consist of 180.6 parts hexamethylenediamine, corresponding to an 84.6% conversion, 10.2 parts hexamethylenimine, and 18 parts polymeric residue.

Example X

Example VI is duplicated, except that 1,4-dicyano-1-butene is substituted for 1,4-dicyano-2-butene and the methanol solution is passed upward through the catalyst bed co-currently with hydrogen. During a period of five hours 56.4 parts 1,4-dicyano-1-butene is passed over the catalyst.

The products consist of 58.47 parts hexamethylenediamine corresponding to a 94.5% conversion. Minor amounts of hexamethylenimine and polymeric residue are obtained.

In the practice of this invention there may be used any active cobalt catalyst. The type and amount of cobalt catalyst employed may be varied considerably. Pyrophoric or stabilized cobalt catalysts either in the massive state, in the form of pellets, or extended on suitable supports such as kieselguhr, alumina, silica, magnesia, and the like, are very effective in producing a rapid hydrogenation with a maximum yield of hexamethylenediamine. Such catalysts may be prepared by reducing with hydrogen, cobalt compounds such as the carbonate, oxide, or hydroxide either alone, deposited on suitable supports, or admixed with oxygenated compounds of other metals known to form hydrogenating oxides, e. g., copper, zinc, etc., or by extracting with alkali wholly or in part the alkali-soluble component of an alloy of cobalt with an alkali-soluble metal as described in U. S. Patent 1,628,190, or by reducing a cobalt salt with sodium naphthalene as described in U. S. Patent 2,177,412. Stabilized cobalt catalysts may be prepared by exposure of pyrophoric cobalt to an oxidizing atmosphere, while maintaining the catalyst mass at a temperature below 50° C. Supported cobalt catalysts may be prepared by adding the supporting material during the catalyst preparation or the support may be formed during the catalyst preparation.

The nitriles useful in the practice of this invention are 1,4-dicyano-1-butene and 1,4-dicyano-2-butene, which are obtained by reacting with HCN the mixture of dichlorobutenes obtained by the chlorination of butadiene-1,3, as described in the copending applications of G. M. Whitman, Serial No. 696,356, filed September 11, 1946, and Serial No. 696,357, filed September 11, 1946, and that of J. R. Johnson and G. M. Whitman, Serial No. 696,358, filed September 11, 1946. All three above-mentioned applications have since become abandoned. However, U. S. patent to Whitman No. 2,477,674 issued August 2, 1949, is a continuation-in-part of said first two mentioned applications and U. S. patent to Johnson and Whitman No. 2,477,617 issued August 2, 1949, is a continuation-in-part of said last-mentioned application.

The process of this invention is usually carried out in the presence of an inert material which is a solvent for the 1,4-dicyanobutene. The amount of solvent used is sufficient to provide nitrile solutions containing from 2 to 50% by weight of dinitrile. In operating a continuous process the amount of nitrile solution passed over the catalyst is such as to provide from 0.10 to 0.50 grams of nitrile and preferably 0.20 to 0.40 grams of nitrile per cc. of catalyst per hour.

The process of this invention represents a marked advance over the art in making it possible to convert 1,4-dicyanobutenes directly to hexamethylenediamine in good yield.

As many apparently widely different embodiments of this invention may be made without departing from the spirit and scope thereof, it is to be understood that this invention is not limited to the specific embodiments thereof except as defined in the appended claims.

We claim:

1. A process for catalytically hydrogenating 1,4-dicyanobutenes in one step to hexamethylenediamine which comprises heating the reactants consisting solely of 1,4-dicyanobutene and hydrogen in the presence of a cobalt hydrogenation catalyst at a temperature in the range of 75° to 200° C.

2. A process for catalytically hydrogenating 1,4-dicyanobutenes in one step to hexamethylenediamine which comprises heating the reactants consisting solely of 1,4-dicyanobutene in an inert solvent and hydrogen in the presence of a cobalt hydrogenation catalyst at a temperature in the range of 75° to 200° C.

3. A process for catalytically hydrogenating 1,4-dicyanobutenes in one step to hexamethylenediamine which comprises heating the reactants consisting solely of 1,4-dicyanobutene and hydrogen under a pressure in excess of 400 lbs./in.$^2$ and in the presence of a cobalt hydrogenation catalyst at a temperature in the range of 75° to 200° C.

4. A process for catalytically hydrogenating 1,4-dicyanobutenes in one step to hexamethylenediamine which comprises heating the reactants consisting solely of 1,4-dicyanobutene in an inert solvent and hydrogen under pressure in excess of 400 lbs./in.$^2$ and in the presence of a cobalt hydrogenation catalyst at a temperature in the range of 90° to 140° C.

5. A process for catalytically hydrogenating 1,4-dicyanobutenes in one step to hexamethylenediamine which comprises heating the reactants consisting solely of 1,4-dicyano-2-butene and hydrogen under a pressure in excess of 400 lbs./sq. in., in the presence of a cobalt hydrogenation catalyst at a temperature in the range of from 75° to 200° C.

6. A process for catalytically hydrogenating 1,4-dicyanobutenes in one step to hexamethylenediamine which comprises heating the reactants consisting solely of 1,4-dicyano-1-butene and hydrogen under a pressure in excess of 400 lbs./sq. in., in the presence of a cobalt hydrogenation catalyst at a temperature in the range of 75° to 200° C.

7. A continuous process for catalytically hydrogenating 1,4-dicyanobutenes in one step to hexamethylenediamine which comprises passing the reactants consisting solely of 1,4-dicyanobutene in an inert solvent and hydrogen in excess based on said dicyanobutene under a pressure in excess of 400 lbs./sq. in., over a cobalt hydrogenation catalyst heated to a temperature in the range of 75° to 200° C., said reactants being passed over said heated cobalt hydrogenation catalyst at the rate of from 0.10 to 0.50 gram of 1,4-dicyanobutene per cc. of cobalt catalyst per hour.

8. The process set forth in claim 7 in which the cobalt hydrogenation catalyst is heated to a temperature in the range of 90° to 140° C.

BENJAMIN W. HOWK.
GERALD M. WHITMAN.

REFERENCES CITED

The following references are of record in the file of this patent:

UNITED STATES PATENTS

| Number | Name | Date |
|---|---|---|
| 1,891,055 | Reppe et al. | Dec. 13, 1932 |
| 2,160,578 | Schmidt | May 30, 1939 |
| 2,166,183 | Signaigo | July 18, 1939 |
| 2,234,566 | Lazier et al. | Mar. 11, 1941 |
| 2,342,101 | Cass et al. | Feb. 22, 1944 |
| 2,448,755 | Zellner | Sept. 7, 1948 |

FOREIGN PATENTS

| Number | Country | Date |
|---|---|---|
| 490,922 | Great Britain | May 16, 1937 |